E. F. JOYCE.
MEANS FOR LOCKING NUTS, BOLTS, AND THE LIKE.
APPLICATION FILED DEC. 7, 1917.
1,320,475.
Patented Nov. 4, 1919.
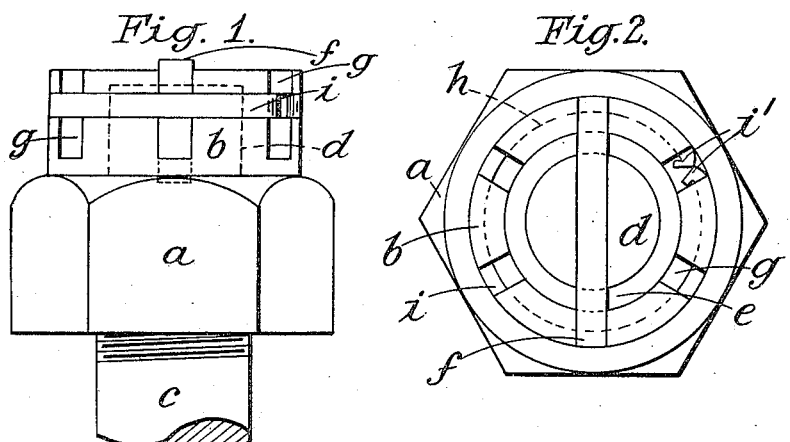
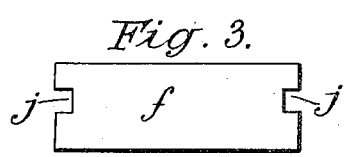
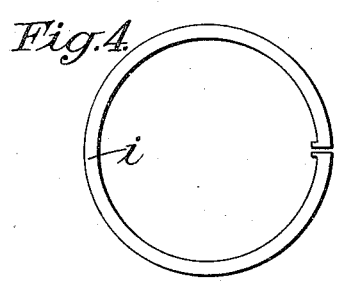
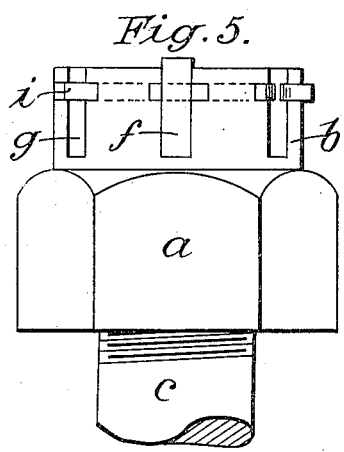
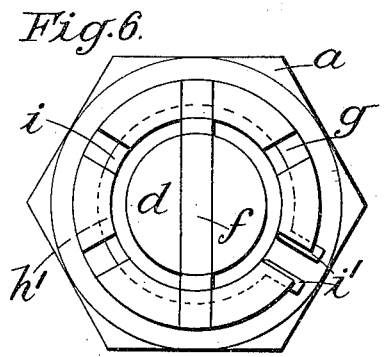
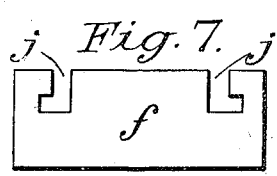
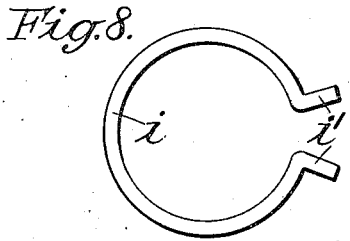

E. F. JOYCE.
MEANS FOR LOCKING NUTS, BOLTS, AND THE LIKE.
APPLICATION FILED DEC. 7, 1917.
1,320,475.
Patented Nov. 4, 1919.
4 SHEETS—SHEET 2.
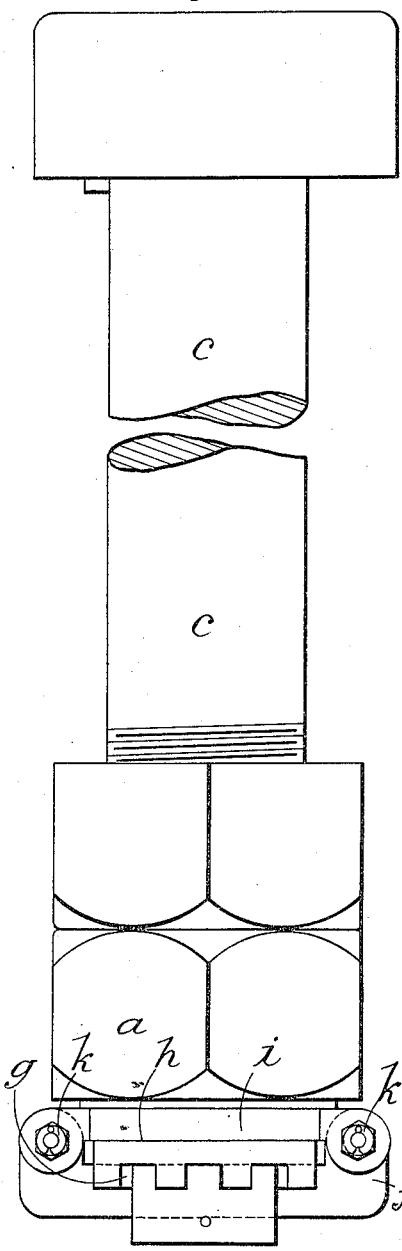
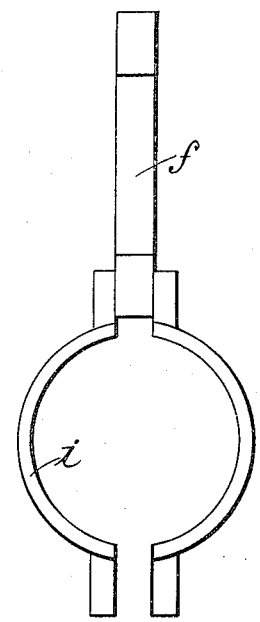
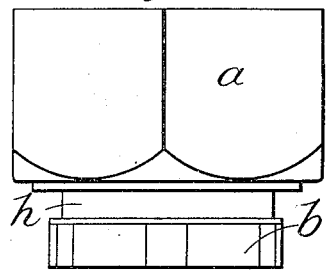

E. F. JOYCE.
MEANS FOR LOCKING NUTS, BOLTS, AND THE LIKE.
APPLICATION FILED DEC. 7, 1917.
1,320,475.
Patented Nov. 4, 1919.
4 SHEETS—SHEET 3.
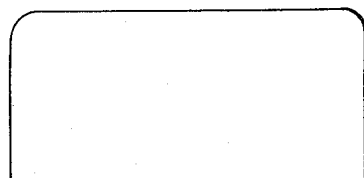
Fig. 10.
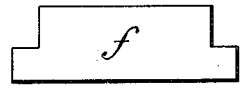
Fig. 14.
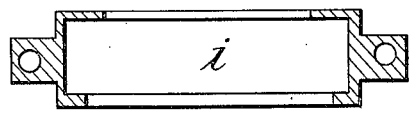
Fig. 13.
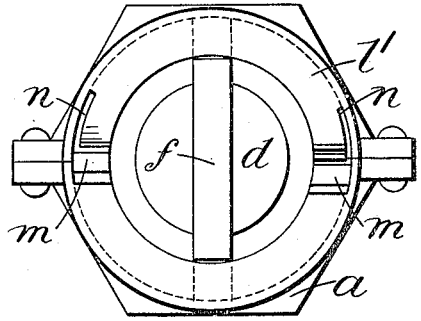
Fig. 15.
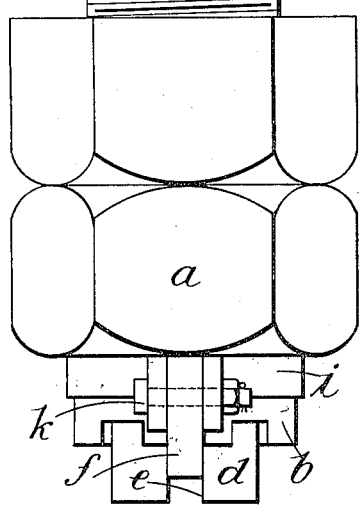
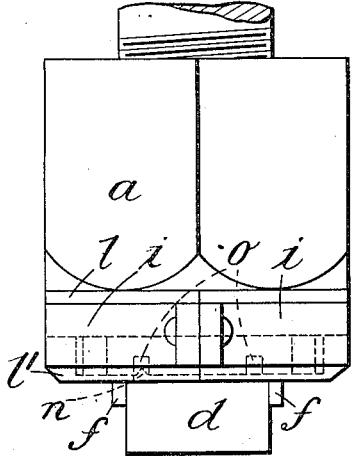
Fig. 16.

E. F. JOYCE.
MEANS FOR LOCKING NUTS, BOLTS, AND THE LIKE.
APPLICATION FILED DEC. 7, 1917.
1,320,475.
Patented Nov. 4, 1919.
4 SHEETS—SHEET 4.
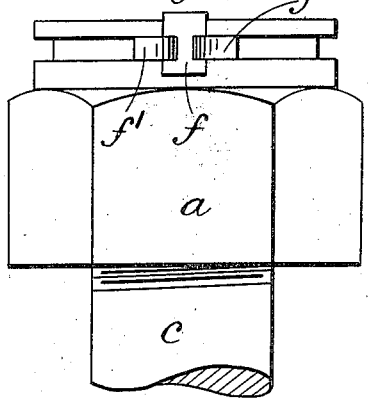
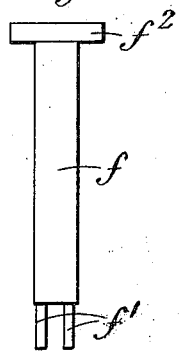
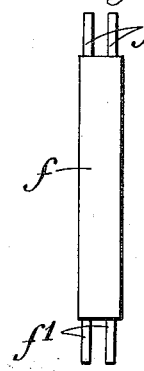
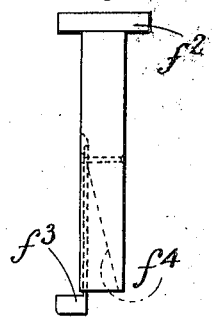
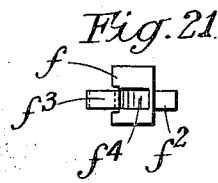

UNITED STATES PATENT OFFICE.

ERNEST FREDERICK JOYCE, OF WOKING, ENGLAND.

MEANS FOR LOCKING NUTS, BOLTS, AND THE LIKE.

1,320,475.     Specification of Letters Patent.     Patented Nov. 4, 1919.

Application filed December 7, 1917. Serial No. 206,100.

*To all whom it may concern:*

Be it known that I, ERNEST FREDERICK JOYCE, a subject of the King of Great Britain and Ireland, and resident of "Rosedale," York Road, Woking, county of Surrey, England, have invented certain new and useful Improvements in Means for Locking Nuts, Bolts, and the like, of which the following is a specification.

This invention for improvements in means for locking nuts, bolts and the like relates to locking devices which positively engage both the nut and bolt and has for its object to provide reliable locking means of this type that shall remove all danger of nuts working loose or coming off and thereby avoid the damage often considerable, arising from this cause especially in the case of bolts employed in connecting rod ends or other moving parts of engines, heavy or rapid running machinery or plant.

With the above objects in view, my invention comprises a transverse locking blade or member arranged to engage with its middle portion in a slot or recess formed to receive it in the end of the bolt and with its ends in slots formed in the nut and means for retaining the blade in position in the slots or recesses. One form of blade retaining means according to this invention consists of a ring or collar applicable to a grooved extension or neck formed to receive it on the outer end of the nut, said ring or collar being arranged to engage with the opposite ends of the locking blade to retain it in position. In an alternative arrangement suitable retaining devices are formed on, attached to, or carried by the locking blade itself and adapted to engage the said groove or its equivalent in the nut.

In cases where it is not desired to carry the recess or slot right through the end of the bolt the portion of the locking blade intermediate the ends thereof may be made to embrace the bolt instead of passing through it, and be formed with internal projections arranged to engage shallow grooves in the bolt.

The invention is hereinafter described with reference to the accompanying drawings in which:—

Figure 1 is a side elevation of the screw-threaded end of a bolt and its nut provided with locking means in accordance with this invention.

Fig. 2 is an end view of same.

Figs. 3 and 4 are detail views of the locking blade and ring respectively.

Figs. 5 to 8 are similar views to Figs. 1 to 4 illustrating a modified form of construction of the locking means.

Figs. 9 and 10 are elevations at right angles of a bolt and lock nut illustrating a further modified form of construction.

Figs. 11 and 12 are detail views illustrating respectively a collar with hinged locking blade, and the nut from which it is detached.

Figs. 13 and 14 are detail views of a further form of collar and locking blade.

Figs. 15 and 16 are end and side views showing the same applied to a bolt and nut.

Fig. 17 is a side elevation of the screw-threaded end of a bolt and its nut illustrating a locking blade for use without a separate retaining ring.

Figs. 18 and 19 illustrate in plan two forms of the locking blade shown in Fig. 17 and Figs. 20 and 21 are detail plan and elevation respectively of a further modified form of locking blade.

Referring to Figs. 1 to 4, the nut $a$ has a castellated extension $b$, while the bolt $c$ is formed in the end $d$ with a diametrical slot or recess $e$. The slotted end $d$ as shown is without screw threads and of less diameter than the screw threaded portion but it will be obvious that end $d$ could be of the same diameter as the screw threaded part and likewise threaded to pass through the nut if desired. A transverse steel locking blade $f$ is arranged to fit in the slot or recess $e$ in the end of the bolt and also in the diametrically opposed recesses or slots $g$ in the castellated extension $b$ of the nut which are brought into alinement with the recess $e$.

The length of the blade $f$ is preferably equal to the diameter of the castellated extension $b$, the circular segmental components of which are grooved externally as shown at $h$ to receive a locking collar or ring $i$ made of soft iron, copper or other suitable metal. This collar or ring is a tight fit in the groove and also fits in grooves or notches $j$ in the ends of the locking blade $f$ to retain the blade in position in the slots.

In order to secure the collar itself in position in the groove $h$ its ends are bent inward opposite one of the slots $g$ as shown in Fig. 2.

In the modified form of construction shown in Figs. 5 to 8 the locking ring $i$ is preferably made of steel and is sprung into an internal groove $h^1$ in the castellated extension $b$ of the nut. In this case the blade $f$ is formed as shown with annular slots $j^1$ for receiving the ring $i$ and permitting it to be sprung into the groove $h^1$ but plain slots could serve the same purpose as will be readily understood.

Extensions $i^1$ on the ends of the ring $i$ enable the ring to be easily contracted by the application of a suitable tool during its insertion or removal. If desired the recesses $g$ in the extension $b$ may be enlarged opposite the groove $h^1$ to accommodate the extensions $i^1$.

In the modified form of construction illustrated in Figs. 9 to 12 the collar $i$ is mounted to rotate in the groove $h$ of the castellated extension $b$ of the nut, the collar being formed in two parts which are secured together by bolts $k$. In this arrangement the locking blade $f$ which engages a recess $e$ in the end of the bolt $c$ and recesses $g$ in the part $b$ of the nut as described is fixed between the halves of the collar by the bolts $k$ and can be released by turning it about one of the bolts $k$ when the other is removed.

In the arrangement shown in Figs. 13 to 16 a two part collar $i$ is riveted together and incloses the castellated extension of the nut. In order to retain this collar in position it is provided with an inturned annular flange $l$ which engages in a groove or behind a shoulder on the said extension. A second inturned flange $l^1$ on the collar covers the end of the castellated portion of the nut but has diametrically opposite portions cut away at $m$ to permit of the insertion in the bolt or nut slots of a locking blade $f$ shaped as shown in Fig. 14, after which the collar is turned through suitable angle so that the locking blade is held in position by the uncut portions of the flange, the collar being finally fixed in that position by bending portions $n$ of the flange $l^1$ inward into slots $o$ made to receive them in the castellated portion of the nut. It will be evident that instead of forming this collar in two parts it could be made as a complete ring and have one edge contracted when in position to retain it on the nut.

As illustrated in Figs. 17 to 19, the locking blade $f$ is provided at the ends with retaining prongs or projections $f^1$ capable of being bent back into engagement with the groove in the nut $a$ when the blade is in the locking position, thus enabling the blade $f$ to be secured into position without the use of a separate retaining ring or collar. The prongs $f^1$ are either formed integral with or attached to the blade which in the latter case could be bored to receive them. Thus the prongs could be made of the same kind of metal as the blade or of a different metal. There may be two prongs at each end as shown or only one prong at each end, or the prongs at one end may be replaced by an enlargement or head $f^2$ Fig. 18 arranged to fit in the groove in the nut.

Figs. 20 and 21 illustrate a locking blade $f$ with a head $f^2$ at one end and a spring catch $f^3$ at the opposite end, a recess $f^4$ being formed in the blade to permit the spring catch $f^3$ to be pressed out of its operative position when the blade is being inserted or driven into the slots or recesses in the bolt and nut, or removed therefrom.

When it is not desired to slot the end of the bolt the middle portion of the transverse locking blade is made in the form of a ring arranged to fit over the end of the bolt between the bolt and the castellated extension of the nut and provided with internal projections or ribs arranged to engage corresponding grooves in the bolt at the end thereof, while the ends are formed like the ends of the straight blades hereinbefore described for engaging the castellated or slotted part of the nut being also recessed to receive a retaining ring or provided with other retaining means as described.

Various other changes or modifications may be made without departing from the principle of the invention as will be readily understood.

What I claim and desire to secure by Letters Patent is:—

1. An improved means for locking together nuts and bolts consisting of a locking blade arranged to engage with its intermediate and end portions respectively with slots or recesses formed in the bolt and nut and a ring or collar applicable to a grooved extension or neck on the outer end of the nut and engaging opposite ends of the locking blade to secure it in position substantially as described.

2. A nut lock comprising a transverse locking blade arranged to engage a slot or recess in the end of the bolt and also in a slotted or castellated extension on the nut, and a ring or collar adapted to be secured in a groove around the castellated extension and engaging grooves, notches or slots in the ends of the locking blade to secure the blade in position substantially as described.

In testimony whereof I have affixed my signature.

ERNEST FREDERICK JOYCE.

Copies of this patent may be obtained for five cents each, by addressing the "Commissioner of Patents, Washington, D. C."